US009326124B2

(12) United States Patent
Jeong et al.

(10) Patent No.: US 9,326,124 B2
(45) Date of Patent: Apr. 26, 2016

(54) METHOD AND APPARATUS FOR INFORMING A RADIO ACCESS NETWORK OF A SELECTED CORE NETWORK FROM USER EQUIPMENT IN A NETWORK SHARING SYSTEM

(75) Inventors: Kyeong-In Jeong, Suwon-si (KR); Gert Jan Van Lieshout, Staines (GB); Kook-Heui Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 11/295,722

(22) Filed: Dec. 7, 2005

(65) Prior Publication Data

US 2006/0183502 A1    Aug. 17, 2006

(30) Foreign Application Priority Data

Dec. 7, 2004   (KR) .................. 10-2004-0102682

(51) Int. Cl.
*H04W 8/02* (2009.01)
*H04W 48/18* (2009.01)

(52) U.S. Cl.
CPC ............. *H04W 8/02* (2013.01); *H04W 48/18* (2013.01)

(58) Field of Classification Search
CPC ................................................... H04W 48/18
USPC ............. 455/435.1, 435.2, 435.3, 445, 422.1, 455/432.1, 436–443; 370/352, 353, 338, 370/401, 410, 354, 331
See application file for complete search history.

(56) References Cited

U.S. PATENT DOCUMENTS

| 6,567,667 | B1 | 5/2003 | Gupta et al. ................. 455/445 |
| 6,782,274 | B1 * | 8/2004 | Park et al. .................. 455/552.1 |
| 6,801,786 | B1 | 10/2004 | Korpela .................... 455/552.1 |
| 7,305,251 | B2 * | 12/2007 | Kuchibhotla et al. ...... 455/552.1 |

(Continued)

FOREIGN PATENT DOCUMENTS

| EP | 1353521 A1 * | 10/2003 | ............... H04Q 7/32 |
| RU | 2210194 | 8/2003 | |

(Continued)

OTHER PUBLICATIONS

"Universal Mobile Telecommunications System (UMTS); Network sharing; Architecture and functional description (3GPP TS 23.251 version 6.0.0 Release 6); ETSI TS 123 251"; ETSI Standards, European Telecommunications Standards Institute, Sophia-Antipo, FR, Jun. 2004, XP002374521.

(Continued)

*Primary Examiner* — Brandon Miller
(74) *Attorney, Agent, or Firm* — Jefferson IP Law, LLP

(57) ABSTRACT

A method of informing a selected CN operator from a UE to a RAN in an NS system where a plurality of CN operators shares the RAN is provided. Upon request of transmission of an IDT, the UE acquires a CN operator ID selected from a multi-ID list broadcasted from a cell in which an RRC connection has been established, and transmits an IDT message with the selected CN operator ID to the RAN. Upon receipt of the IDT message, the RAN determines whether the IDT message includes a selected CN operator ID. In the presence of the selected CN operator ID, the RAN stores the selected CN operator ID in a UE context. In the absence of the selected CN operator ID, the RAN reads a stored selected CN operator ID from the UE context. The RAN then selects a CN operator using the selected CN operator ID.

21 Claims, 8 Drawing Sheets

(56) References Cited

U.S. PATENT DOCUMENTS

| | | | |
|---|---|---|---|
| 7,554,940 B2* | 6/2009 | Kawaguchi et al. | 370/328 |
| 2003/0028644 A1* | 2/2003 | Maguire et al. | 709/226 |
| 2004/0017798 A1* | 1/2004 | Hurtta et al. | 370/352 |
| 2004/0105429 A1 | 6/2004 | Anckar et al. | 370/352 |
| 2004/0162077 A1* | 8/2004 | Kauranen et al. | 455/445 |
| 2004/0185884 A1* | 9/2004 | Marin et al. | 455/466 |
| 2004/0203736 A1* | 10/2004 | Serna | 455/426.1 |
| 2005/0090251 A1* | 4/2005 | Kuchibhotla et al. | 455/435.1 |
| 2005/0090255 A1* | 4/2005 | Kuchibhotla et al. | 455/435.2 |

FOREIGN PATENT DOCUMENTS

| | | |
|---|---|---|
| WO | WO02073993 | 9/2002 |
| WO | WO03058996 | 7/2003 |
| WO | WO-2004-047467 | 6/2004 |
| WO | WO2004075576 | 9/2004 |

OTHER PUBLICATIONS

Samsung et al.; Correction to network sharing functionality; 3GPP TSG RAN2#46; R2-050618; Feb. 14, 2005; Scottsdale, Arizona.

* cited by examiner

METHOD AND APPARATUS FOR INFORMING A RADIO ACCESS NETWORK OF A SELECTED CORE NETWORK FROM USER EQUIPMENT IN A NETWORK SHARING SYSTEM

PRIORITY

This application claims priority under 35 U.S.C. §119(a) to an application entitled "Method and Apparatus for Informing Selected Core Network from User Equipment to Radio Access Network in a Network Sharing System" filed in the Korean Intellectual Property Office on Dec. 7, 2004 and assigned Serial No. 2004-102682, the entire disclosure of which is hereby incorporated by reference.

BACKGROUND OF THE INVENTION

1. Field of the Invention

The present invention relates to a Network Sharing (NS) system. More particularly, the present invention relates to a method and apparatus for informing a Radio Access Network (RAN) of a selected Core Network (CN) operator from a User Equipment (UE).

2. Description of the Related Art

A mobile communication system basically includes a RAN and a UE. The RAN has a Node B and is connected to a second network through a CN. RANs, which are operated by different operators or use different radio access techniques, can be connected to a plurality of CNs operated by the same or different CN operators. Sharing a RAN among different CN operators is called network sharing.

In a Code Division Multiple Access (CDMA) cellular mobile communication system, a RAN includes a Base Transceiver Subsystem (BTS) and a Base Station Controller (BSC). The RAN is connected to a CN with a Mobile Switching Center (MSC). Meanwhile, in a Global System for Mobile communications (GSM)-based Wideband CDMA (WCDMA) system, that is, Universal Mobile Telecommunications System (UMTS), a RAN includes a Node B and a Radio Network Controller (RNC) and is connected to a CN with a Serving General Packet Radio Service (GPRS) Support Node (SGSN).

CN operators are identified by Public Land Mobile Network (PLMN) Identifies (ids). A PLMN id is a combination of a Mobile Country Code (MCC) and a Mobile Network Code (MNC). A UE selects a PLMN id identifying a desired CN operator for itself or under the control of the network. To access the selected CN, the UE needs to notify the PLMN id of the RAN.

Since conventionally, there are no procedures specifying as to when and how the UE is to transmit a selected PLMN id to the RAN, the RAN cannot perform accurate routing to a selected CN for the UE.

Accordingly, there is a need for a specific signaling procedure by the UE for informing the RAN of a selected PLMN id to be transmitted.

SUMMARY OF THE INVENTION

An aspect of embodiments of the present invention is to address at least the above problems and/or disadvantages and to provide at least the advantages described below. Accordingly, an aspect of the present invention is to provide a signaling method and apparatus for informing a RAN of a UE-selected PLMN id in an NS system.

The above object is achieved by providing a method of informing a selected CN operator from a UE to a RAN in an NS system where a plurality of CN operators share the RAN.

According to one aspect of the exemplary embodiments of the present invention, in a method of informing a RAN of a selected CN operator in a UE in an NS system where a plurality of CN operators share the RAN, the UE generates an Initial Direct Transfer (IDT) message. The IDT message requests a signaling connection and acquires a CN operator Identifier (ID) selected among CN operator IDs in a multi-ID list broadcasted from a cell in which an Radio Resource Control (RRC) connection has been established. The UE then inserts the selected CN operator ID in the IDT message and transmits the IDT message to an RNC of the RAN.

According to another aspect of the exemplary embodiments of the present invention, in a method of being informed of a CN operator selected by a UE in a RAN in an NS system where a plurality of CN operators share the RAN, the RAN receives an IDT message for requesting a signaling connection from the UE. The RAN then determines whether the IDT message includes a CN operator ID selected by the UE. If the IDT message includes the selected CN operator ID, the RAN stores the selected CN operator ID in a UE context for the UE. If the IDT message does not include the selected CN operator ID, the RAN acquires a stored selected CN operator ID from the UE context. The RAN then selects a CN operator using the selected CN operator ID.

According to a further aspect of the exemplary embodiments of the present invention, in an apparatus for informing a RAN of a CN operator selected by a UE in an NS system where a plurality of CN operators share the RAN, a controller generates an IDT message for requesting a signaling connection. The controller then inserts in the IDT message a CN operator ID selected among CN operator IDs in a multi-ID list broadcast from a cell with which the UE has established an RRC connection. A transmitter and receiver transmit the IDT message to a RNC of the RAN.

Other objects, advantages, and salient features of the invention will become apparent to those skilled in the art from the following detailed description, which taken in conjunction with the annexed drawings, discloses exemplary

BRIEF DESCRIPTION OF THE DRAWINGS

The above and other objects, features and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modification of the embodiments described herein can be made without departing from the scope and spirit of the invention. Also, descriptions of well-known functions and constructions are omitted for clarity and conciseness.

The subject matter of the exemplary embodiments of the present invention relates to a UE that accesses a RAN in a NS system, where different CN operators share a RAN. The UE signals to the RAN an ID (that is, PLMN id) of a selected CN operator. The subject matter of the exemplary embodiments of the present invention further relate to a UE operation for the signals to the RAN. Below, a description will be made of a specific signaling procedure for informing a selected PLMN id and a UE operation for including the selected PLMN id in a message. For example, when the PLMN id is included in the signaling message and how the UE operates regarding inclusion of the PLMN id in the signaling message will be described.

Figure 1:
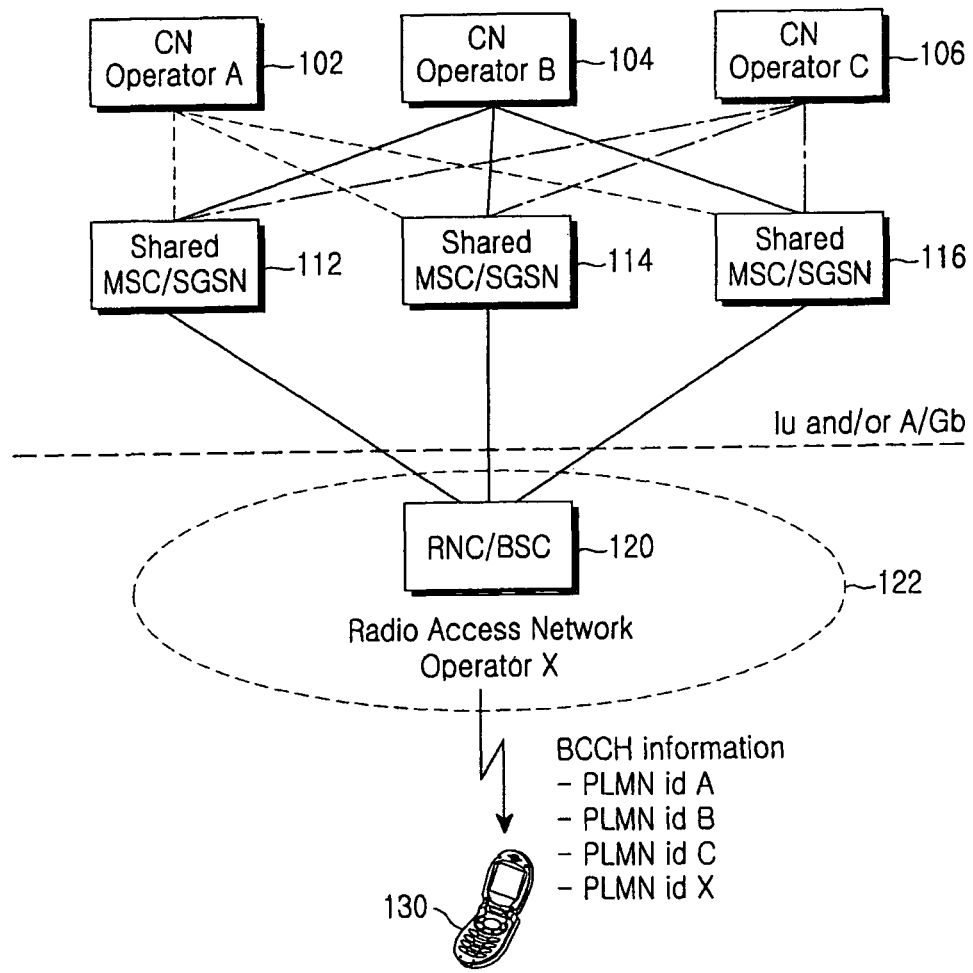
FIG. 1 illustrates the configuration of an NS system where different CN operators share a RAN.

FIG. 1 illustrates the configuration of an NS system where different CN operators share a RAN. While the network configuration is based on 3rd generation (3G) asynchronous mobile communication standards set by 3rd Generation Partnership Project (3GPP), the present invention is not limited to the 3G standards. However, the exemplary embodiments of the present invention are applicable to any technology fields in which a RAN is shared among a plurality of CN operators.

Referring to FIG. 1, a RAN 120, of which the service coverage is a cell 122, includes an RNC or a BSC. The RAN 120 is connected to CN nodes 112, 114 and 116 via an Iu interface and/or an A/Gb interface. Each of the CN nodes 112, 114 and 116 includes an SGSN or an MSC.

Different CN operators 102, 104 and 106 (CN operators A, B and C, respectively) share the MSCs/SGSNs 112, 114 and 116. The RAN 120 belongs to a CN operator X and is shared among the CN operators 102, 104 and 106. The RAN 120 transmits to a UE 130 a multi-PLMN list listing the PLMN ids of the CN operator X and the CN operators 102, 104 and 106 by system information delivered on a Broadcast Control CHannel (BCCH) established in the cell 122. The UE 130 selects one of the PLMN ids in an Access Stratum (AS) layer or a Non Access Stratum (NAS) layer. The AS layer is associated with an Uu interface between the RNC and the UE. The NAS layer overlies the AS layer, associated with the interface between the UE and a CN.

The UE 130 communicates with the RAN 120 by the RRC protocol and exchanges RRC messages with the RAN 120. The RRC messages exchanged include CN types, Direct Transfer (DT) messages that deliver Call Control (CC) messages and Mobility Management (MM) messages. The DT messages contain CN-related Information Elements (IEs). The DT messages are Initial Direct Transfer (IDT), downlink DT, and uplink DT. The IDT message is transmitted to request a signaling connection setup when the UE initially requests communications with the RAN. The downlink/uplink DT message carries CC/MM-related IEs after the IDT message.

Figure 2:
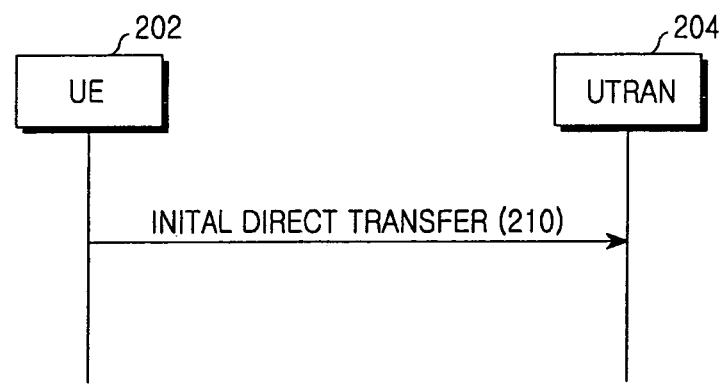
FIG. 2 is a diagram illustrating an IDT signaling flow.

A selected PLMN id notifies the network in an IDT message of a signaling flow, which is RRC signaling. As illustrated in FIG. 2, a UE 202 transmits an IDT message 210 to a UMTS RAN (UTRAN) 204. When a signaling connection to a network or transmission of an initial NAS message is requested from an upper layer, the UE 202 transmits the IDT message 210 to the UTRAN 204 on the uplink.

The IDT message 210 is carried on a Dedicated Control CHannel (DCCH) by an Acknowledged Mode (AM) Radio Link Controller (RLC). The UTRAN 204 sets up a signaling connection to the CN node of a target domain using the IDT message 210 and routes the NAS message to the CN node via the signaling connection.

The IDT message contains a PLMN id selected from the multi-PLMN list by the AS or NAS layer of the UE for registration to a CN operator. The RAN determines a CN operator for the UE based on the PLMN id set in the IDT message and accurately routes the NAS message. The UE selects the PLMN id of a CN operator that can offer a suitable cell to the UE.

In the UMTS system, an RNC, which the UE has established an initial RRC connection is called a Serving RNC (SRNC). As the UE moves to a cell covered by another RNC, it is connected to the SRNC via the other RNC which is called a Drift RNC (DRNC). The DRNC has no authority to control the UE and relay messages between the SRNC and the UE.

In this case, the DRNC broadcasts PLMN ids to the UE in the current cell. If the DRNC is different from the SRNC, the SRNC, which is responsible for routing a NAS message between the UE and a CN, has no relation to the PLMN ids. As a result, the PLMN ids may not be available to the SRNC for selecting a CN operator. Moreover, the routing of a NAS message to the CN may not be available because the use of the PLMN ids provided by the DRNC may cause errors or malfunction the SRNC. In accordance with an exemplary embodiment of the present invention, the IDT message is configured to include a selected PLMN id among the PLMN ids broadcasted from a cell in which an RRC connection has been successfully established, rather than include a PLMN id broadcasted from the current cell.

Consequently, the UE includes in the IDT message a PLNM id selected among PLMN ids broadcasted from the cell in which an RRC connection has been established in the NS system. Upon successful setup of the RRC connection, the UE stores a multi-PLMN list broadcasted from the cell in which the UE has been RRC-connected, or a PLMN id selected from the multi-PLMN list.

Figure 3:
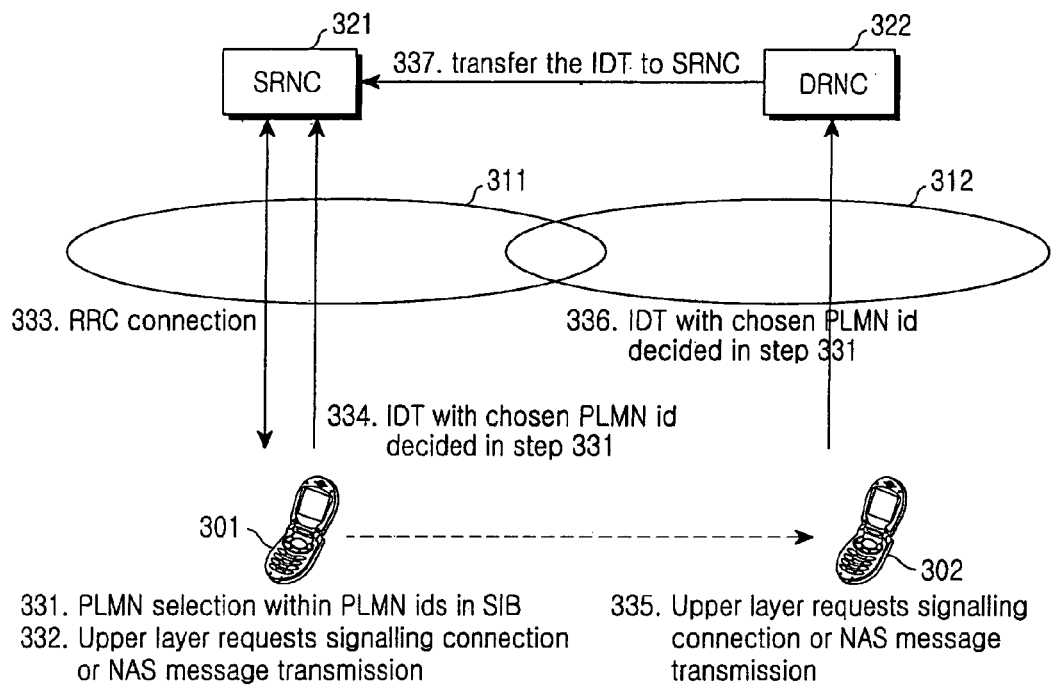
FIG. 3 illustrates a UE operation for including a selected PLMN id in IDT messages to be delivered to a UTRAN according to an exemplary embodiment of the present invention.

FIG. 3 illustrates a UE operation for including a selected PLMN id in IDT messages to be delivered to a UTRAN according to an exemplary embodiment of the present invention. A UE informs a network of a selected PLMN id by IDT signaling in the illustrated NS system. The UE transmits a selected PLMN id among the PLMN ids broadcasted from a cell in which an RRC connection has been successfully established in each IDT message. Reference numeral 301 denotes a UE located in a cell 311 covered by an SRNC 321. The cell 311 broadcasts the PLMN ids of CN operators sharing the SRNC 321 in a System Information Block (SIB).

Referring to FIG. 3, the UE 301 acquires PLMN ids broadcast from the cell 311 and selects one of the PLMN ids in step 331. For example, the UE 301 selects an appropriate PLMN id for which the cell 311 is a suitable cell. The PLMN selection is made by the AS or NAS layer of the UE 301. Alternatively, the UE 301 can select the PLMN id of a CN operator with the highest priority level, referring to predetermined priority levels of CN operators. A selection process of an appropriate PLMN id will be omitted from the description of the exemplary embodiments of the present invention for clarity and conciseness. In step 332, an upper layer requests a signaling connection to the network or a transmission of an initial NAS message in the UE 321, thereby triggering transmission of an IDT message. If an RRC connection does not exist, the UE 332 establishes the RRC connection with the SRNC 321 prior to transmission of an IDT message.

In step 333, the UE 301 establishes the RRC connection for IDT signaling and stores the selected PLMN id for the cell 311 to which the UE 301 has been RRC-connected. The UE 301 transmits an IDT message with the selected PLMN id via the RRC connection in step 334. The SRNC 321 determines a selected PLMN (that is, CN operator) from the PLMN id set in the IDT message and transmits a NAS message to the CN node of the PLMN via a signaling connection. The SRNC 321 can store the PLMN id in a UE context for the UE 301.

The UE 301 moves out of the cell 311 of the SRNC 321 and enters the cell 312 of a DRNC 322. Now the UE 301 is referred to as a UE 302. The cell 312 broadcasts PLMN ids, at least part of which are different from those broadcasted from the cell 311. In the case where the DRNC 322 is shared among entirely different CN operators from those sharing the SRNC 321, the cell 312 broadcasts different PLMN ids from those of the cell 311.

In step 335, the upper layer of the UE 302 requests a signaling connection to the network or a transmission of an initial NAS message. The UE is kept at an RRC connected mode without transitioning to an idle mode, as it moves from the cell 311 to the cell 312. Step 335 is implemented by various methods. One method of requesting a signaling connection is implemented by the UE 302 requesting a signaling connection to a Packet Switched (PS) domain while the UE 302 is at a Circuit Mobility Management (CMM)_Connected mode. While IDT messages can be successively generated in other methods, a detailed description of the other methods will be omitted for clarity and conciseness.

The UE 302 transmits an IDT message with the selected PLMN id to the DRNC 322 in step 336, also described in step 334. Accordingly, the UE 302 includes in the IDT message the selected PLMN id among the PLMN ids broadcasted from the cell 311 in which the UE has been RRC-connected, rather than include one of PLMN ids broadcasted from the current cell 312 and transmit the IDT message to the cell 312. In step 337, the DRNC 322 transmits the received IDT message to the SRNC 321. The SRNC 321 selects a CN operator for processing the IDT message based on the PLMN id set in the IDT message.

If the UE 302 transitions to the idle mode before moving from the cell 311 to the cell 312, it establishes an RRC connection with the RNC 322 after step 335. As a result, the RNC 322 becomes an SRNC. Then the UE 302 selects one of the PLMN ids broadcasted from the cell 312 and later includes the PLMN id in an IDT message.

As described above, in accordance with the exemplary embodiments of the present invention, the UE notifies a selected PLMN id among the PLMN ids broadcasted from a cell that the UE has established an RRC connection by IDT signaling. If the RRC connection does not exist, the UE establishes the RRC connection prior to the IDT signaling. However, if the RRC connection has been established with the current cell, the UE includes a selected PLMN id broadcasted from the current cell in an IDT message. As the UE moves to another cell, the UE stores the selected PLMN id and later uses the PLMN id in transmitting an IDT message.

Figure 4:
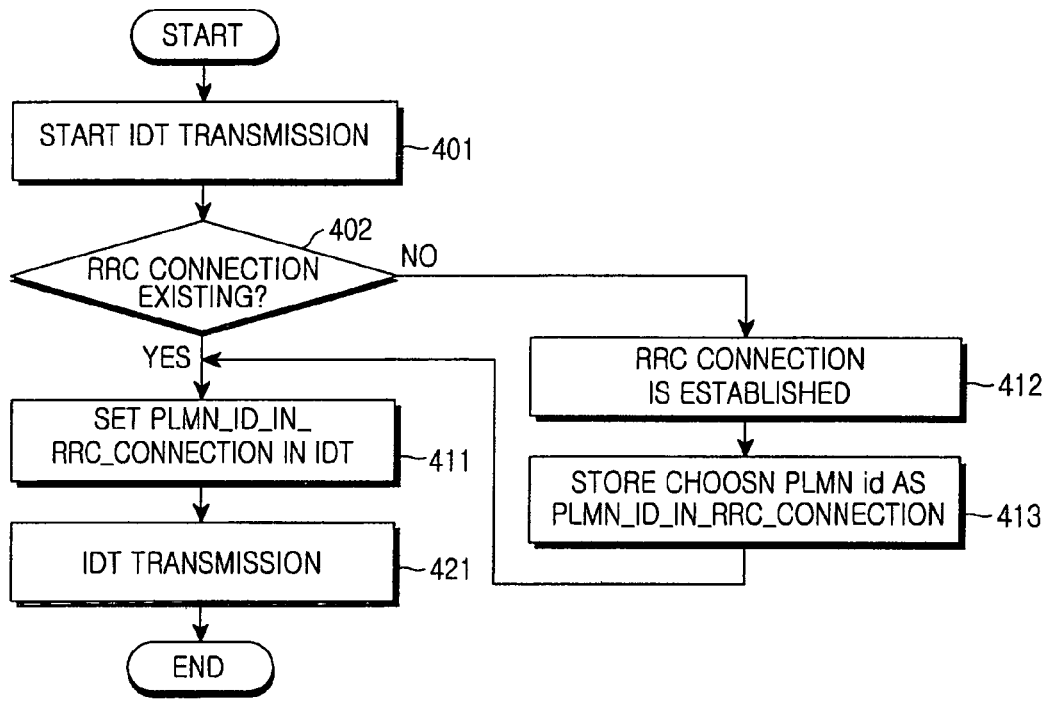
FIG. 4 is a flowchart illustrating the UE operation described in FIG. 3.

FIG. 4 is a flowchart illustrating the UE operation described in FIG. 3.

Referring to FIG. 4, upon request from an upper layer, IDT signaling starts and an IDT message is generated in the UE in step 401. In step 402, the UE determines whether an RRC connection exists, that is, whether the UE is in an RRC connected mode. In the presence of the RRC connection, the UE includes a selected PLMN id among the PLMN ids broadcasted from a cell in which the RRC connection was established in the IDT message in step 411. The selected PLMN id has been preserved as PLMN_ID_IN_RRC_CONNECTION. In step 421, the UE transmits the IDT message with the PLMN id to the RAN of the current cell. It can be further contemplated as another exemplary embodiment of the present invention that the UE stores the PLMN ids broadcast from the cell in which the RRC connection was established and transmits an IDT message with the selected PLMN id, upon request of IDT signaling. In this case, while the PLMN id choice takes place in the current cell, the PLMN ids are acquired from the RRC-connected cell.

In the absence of the RRC connection in step 402, the UE establishes the RRC connection with the RNC of the current cell in step 412. The RNC acts as an SRNC for the UE. If the RRC connection is successful, the UE stores a selected PLMN id among the PLMN ids broadcasted from the current RRC-connected cell as the PLMN_ID_IN_RRC_CONNECTION in step 413. In step 411, the UE decides to include the PLMN_ID_IN_RRC_CONNECTION as a PLMN id in the IDT message. The UE then transmits the IDT message with the PLMN id to the SRNC in step 421.

In another exemplary embodiment of the present invention, the UE includes a selected PLMN id preferably in the first IDT message after an RRC connection, without including the selected PLMN id in following IDT messages, thereby reducing signaling overhead. The SRNC stores the PLMN id set in the first IDT message in a UE context that contains the connection and profile information of the UE. The SRNC can determine the selected PLMN id for the following IDT messages from the UE context and selects a CN operator for processing the IDT messages using the PLMN id. When the RRC connection is released between the UE and the SRNC, the connection and profile information is initialized.

Figure 5:
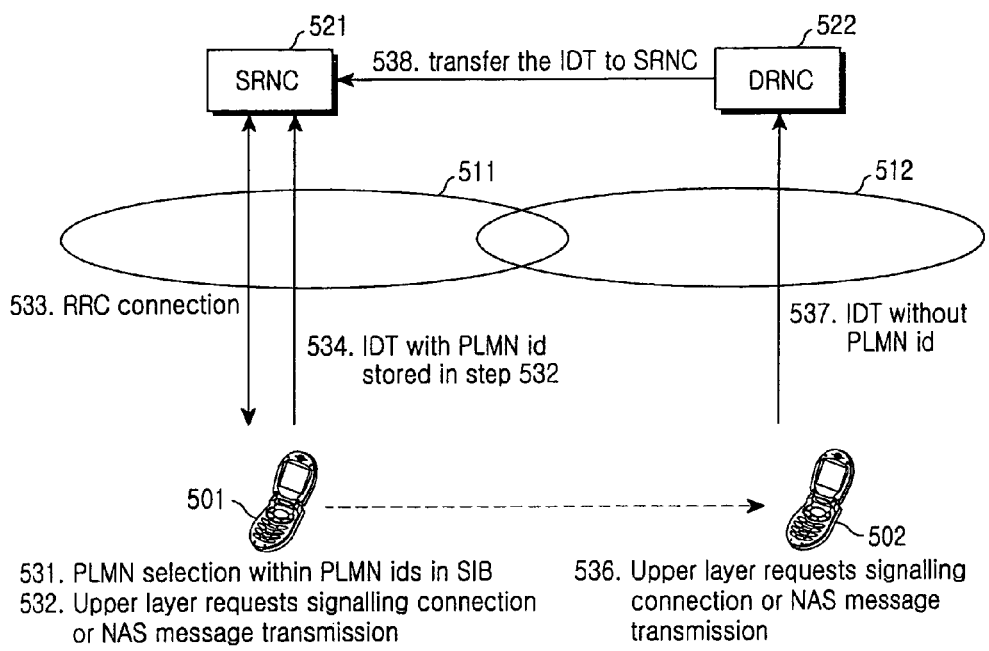
FIG. 5 illustrates a UE operation for including a selected PLMN id in an IDT message to be delivered to a UTRAN according to another exemplary embodiment of the present invention.

FIG. 5 illustrates a UE operation for including a selected PLMN id in an IDT message to be delivered to a UTRAN according to an exemplary embodiment of the present invention.

Referring to FIG. 5, a UE 501 acquires PLMN ids broadcasted from a current cell 511 and selects one of the PLMN ids in step 531. In step 532, an upper layer requests a signaling connection to the network or a transmission of an initial NAS message in the UE 501. If an RRC connection does not exist with the cell 511, the UE 501 establishes the RRC connection with the cell 511 in step 533. The UE 501 then stores the selected PLMN id.

In step 534, the UE 501 transmits the stored PLMN id in the first IDT message after the RRC connection setup to the cell 511 via the RRC connection. Since the RRC connection is established with the current cell 511, the UE 501 includes the PLMN id selected in the cell 511 in the first IDT message. Upon receipt of the first IDT message, an SRNC 521 stores the PLMN id in a UE context for the UE 501. The PLMN id in the UE context is used for selecting a CN operator for processing following IDT messages received from the UE 501 in step 535.

The UE 501 moves out of the cell 511 of the SRNC 521 and enters a cell 512 of a DRNC 522. Now the UE 501 is referred to as a UE 502. The cell 512 broadcasts PLMN ids, at least part of which is different from those broadcasted from the cell 511. In the case where the DRNC 522 is shared among entirely different CN operators from those sharing the SRNC 521, the cell 512 broadcasts different PLMN ids from those of the cell 511.

In step 536, the upper layer of the UE 502 requests a signaling connection to the network or a transmission of an initial NAS message. The UE 502 remains at an RRC connected mode without transitioning to an idle mode, as it moves from the cell 511 to the cell 512. The UE 502 transmits a requested IDT message to the DRNC 522 in step 537. Since this IDT message is not the first IDT message after the RRC connection setup, the IDT message does not include the selected PLMN id.

In step 538, the DRNC 522 transmits the received IDT message to the SRNC 521. The SRNC 521 selects a CN operator for processing the IDT message based on the PLMN id stored in the UE context.

The above-described exemplary embodiment is characterized such that the UE includes the selected PLMN id preferably in the first IDT message after the RRC connection setup. The SRNC operates based on the PLMN id of the first IDT message stored in the UE context. If a SRNC relocation takes place, the old SRNC provides the stored PLMN id to a new SRNC.

Figure 6:
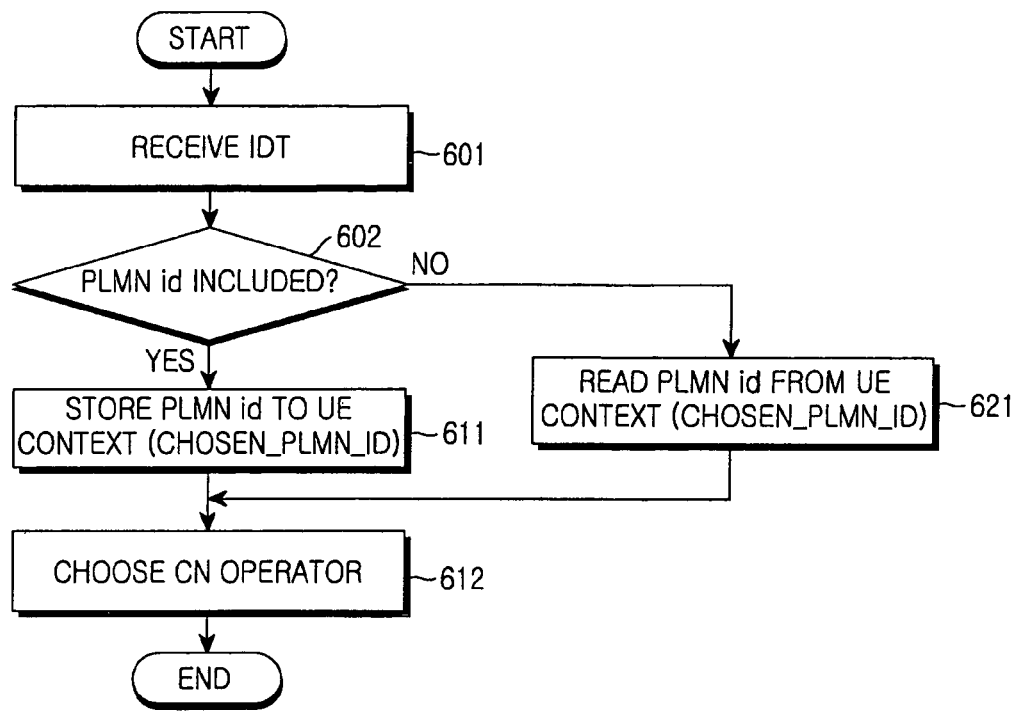
FIG. 6 is a flowchart illustrating an SRNC operation according to the second exemplary embodiment of the present invention.

FIG. 6 is a flowchart illustrating an SRNC operation according to the second exemplary embodiment of the present invention.

Referring to FIG. 6, the SRNC receives an IDT message from the UE in step 601 and determines whether the IDT message includes a UE-selected PLMN id in step 602. In the presence of a PLMN id, the SRNC stores the PLMN id as SELECTED_PLMN_ID in the UE context for the UE in step 611. In step 612, the SRNC selects a CN operator for routing the IDT message based on the SELECTED_PLMN_ID.

In the absence of a PLMN id in step 602, the SRNC reads SELECTED_PLMN_ID from the UE context in step 621 and selects a CN operator for the UE based on the SELECTED_PLMN_ID in step 612.

While not illustrated, if a SRNC relocation takes place, the SRNC provides the UE context with the SELECTED_PLMN_ID to a new SRNC.

Figure 7:
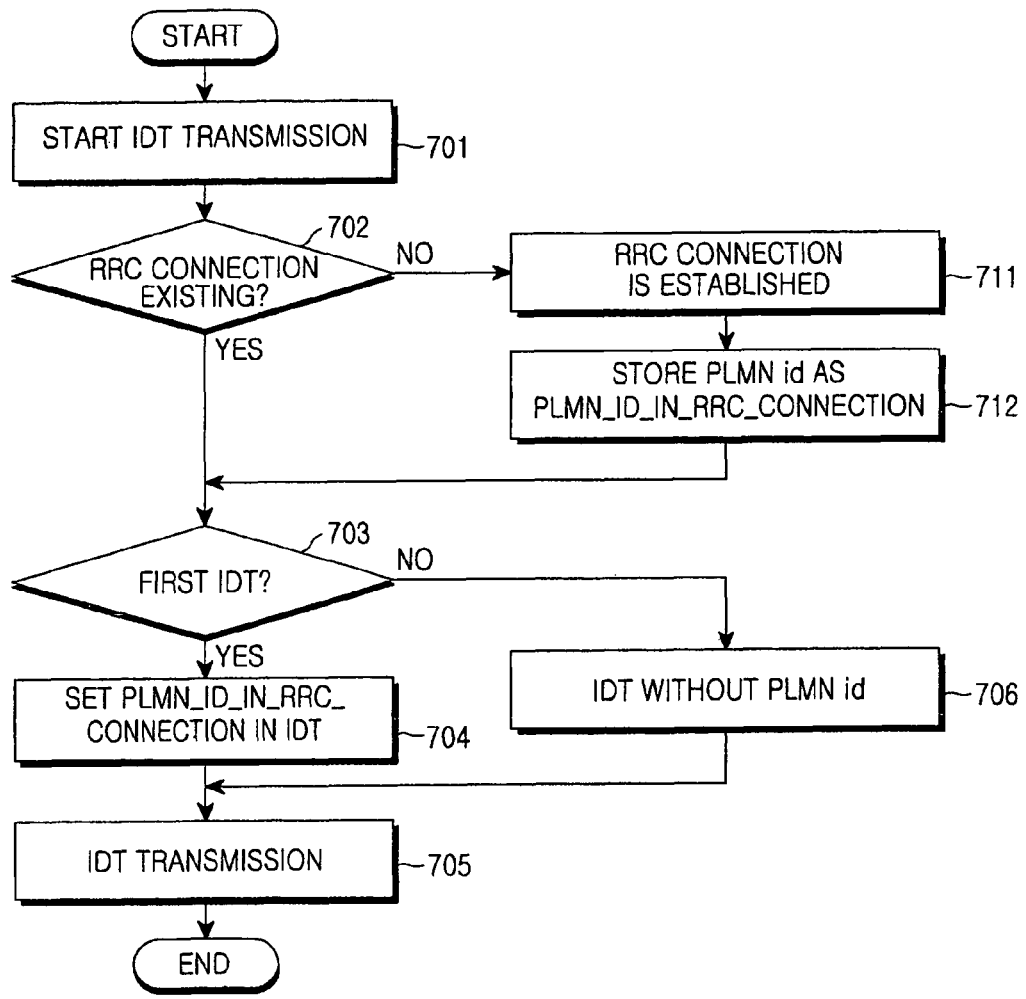
FIG. 7 is a flowchart illustrating a UE operation according to the second exemplary embodiment of the present invention.

FIG. 7 is a flowchart illustrating a UE operation according to the second exemplary embodiment of the present invention.

Referring to FIG. 7, upon request of a signaling connection setup with the network or a transmission of an initial NAS message from the upper layer, IDT signaling starts and an IDT message is generated in the UE in step 701. The UE determines whether an RRC connection exists in step 702. In the absence of the RRC connection, the UE establishes the RRC connection with the RNC of the current cell in step 711 and stores a selected PLMN id among the PLMN ids broadcasted from the current RRC-connected cell as the PLMN_ID_IN_RRC_CONNECTION in step 712. The UE then proceeds to step 703.

In the presence of the RRC connection in step 702, the UE determines whether the current IDT message is the first IDT message after the RRC connection setup in step 703. If the current IDT message is the first IDT message, the UE sets the PLMN_ID_IN_RRC_CONNECTION as a PLMN id in the IDT message in step 704. If the current IDT message is not the first IDT message, the UE does not include the PLMN id in the IDT message in step 706. In step 705, the UE transmits the IDT message generated in step 704 or step 706 to the SRNC. If the UE is located in a cell of the DRNC, the IDT message is transmitted to the SRNC via the DRNC.

It can be further contemplated as another exemplary embodiment of the present invention that the UE transmits a selected PLMN id among the PLMN ids broadcasted from the RRC-connected cell by the first IDT message after the RRC connection setup, and stores the remaining PLMN ids that were broadcasted.

Figure 8:
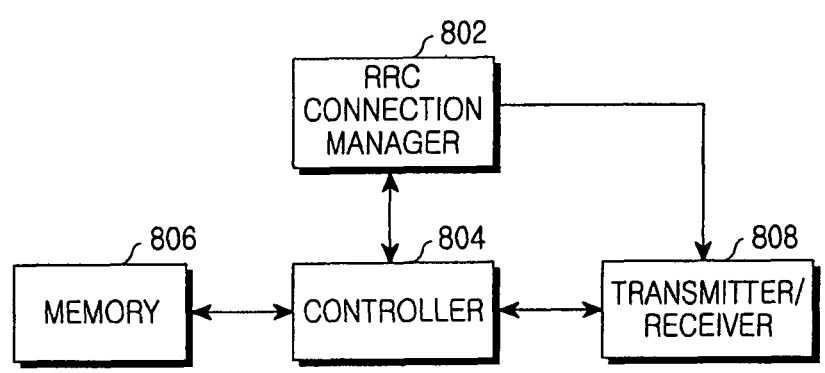
FIG. 8 is a block diagram of a UE or RAN according to an exemplary embodiment of the present invention.

FIG. 8 is a block diagram of a UE or RAN (especially RNC) according to an exemplary embodiment of the present invention.

Referring to FIG. 8, in the UE point of view, upon request from an upper layer (not shown), a controller 804 generates an IDT message for requesting a signaling connection. The controller asks an RRC connection manager 802 about the presence or absence of an RRC connection. The RRC connection manger 802 determines whether an RRC connection exists in response to the request from the controller 804. In the absence of the RRC connection, the RRC connection manager 802 controls a transmitter/receiver 808 to establish the RRC connection with the RAN (RNC) of a current cell. The transmitter/receiver 808 establishes the RRC connection with the RAN (RNC) and provides the controller 804 with an SIB containing PLMN ids broadcasted from the RRC-connected cell, which are received from the RNC. In the presence of the RRC connection, the RRC connection manager 802 tells the controller 804 the existence of the RRC connection.

When the RRC connection exists, the controller 804 selects an appropriate PLMN id received from the transmitter/receiver 808 and stores the PLMN id in a memory 806. If the RRC connection has not been established, the controller 804 reads the stored PLMN id from the memory 806 and transmits the IDT message with the PLMN id to the transmitter/receiver 808.

The controller 804 can determine whether the generated IDT message is the first IDT message after the RRC connection setup. If the IDT message is not the first IDT message, the controller 804 transmits the IDT message without the PLMN id to the transmitter/receiver 808. The transmitter/receiver 808 transmits the IDT message to the RAN via the RRC connection.

Referring to FIG. 8, in the RAN point of view, a transmitter/receiver 808 receives a IDT message, then a controller 804 recognizes a selected CN operator ID from the IDT message, chooses a CN operator using the selected CN operator ID, and controls a transmitter/receiver 808 to establish a connection between the UE and the CN operator corresponding to the CN operator ID. In addition, the controller 804 is able to determine whether the IDT message is the first IDT message after a RRC connection setup. Therefore, if the IDT message is the first IDT message, the controller 804 recognizes a selected CN operator ID from the IDT message. Otherwise the controller 804 acquires the selected CN operator ID from a memory.

A RRC connection manger 802 determines whether an RRC connection exists in response to the request from the controller 804. In the absence of the RRC connection, the RRC connection manager 802 controls the transmitter/receiver 808 to establish the RRC connection with the UE. The transmitter/receiver 808 establishes the RRC connection with the UE. In the presence of the RRC connection, the RRC connection manager 802 informs the controller 804 of the existence of the RRC connection. The memory 806 can save the CN operator IDs received from UEs and other information of the UEs. In FIG. 8, the RRC connection manger 802 is depicted as a separate block. However, because a managing and controlling function (or block) is a function of a controller, the RRC connection manger 802 can be a sub block of the controller 804.

As described above, certain exemplary embodiments of the present invention may effectively inform an SRNC of the RAN of a selected PLMN id identifying a CN operator in an IDT message.

In an NS system where a RAN is shared among a plurality of CNs, the RAN can perform accurate routing to the CN selected by the UE using the PLMN id. Furthermore, transmission of the selected PLMN id preferably in the first IDT message reduces signaling overhead.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for performing an initial direct transfer (IDT) by a user equipment (UE) in a communication system, the method comprising:
   initiating, by the UE, an IDT procedure when an upper layer requests to establish a signaling connection to a network;
   determining, by the UE on a current radio resource control (RRC) connection, if a multiple Public Land Mobile Network (PLMN) list was broadcasted in a cell where the current RRC connection was established;
   if the multiple PLMN list was broadcasted in the cell where the current RRC connection was established, setting, by the UE, a PLMN identifier (ID) in an IDT message to a PLMN chosen among the PLMNs in the multiple PLMN list; and
   transmitting, by the UE, the IDT message including the PLMN ID.

2. The method of claim 1, wherein the PLMN ID comprises a core network (CN) operator ID.

3. The method of claim 1, further comprising:
   storing the PLMN ID in a memory.

4. The method of claim 1, wherein the transmitting of the IDT message comprises:
   determining whether the IDT message is a first message generated after the current RRC connection is established.

5. The method of claim 1, further comprising
   transmitting the IDT message to the network without a PLMN ID, if the IDT message is not the first message generated after the current RRC connection is established.

6. The method of claim 1, further comprising:
   receiving the Multiple PLMN List broadcasted in the cell where the current RRC connection was established.

7. The method of claim 1, wherein the determining of if the PLMN list was broadcasted is performed by a Non Access Stratum (NAS) or Access Stratum (AS).

8. A method for performing an initial direct transfer (IDT) by a network in a communication system, the method comprising:
   receiving an IDT message for establishing a signaling connection from a user equipment (UE);
   acquiring a Public Land Mobile Network identifier (PLMN ID) from the IDT message, the PLMN ID is an ID of a PLMN chosen among PLMNs in a multiple PLMN list broadcast from a cell where a radio resource control (RRC) connection was established, the RRC connection being a current RRC connection of the UE that initiates an IDT procedure;
   storing the PLMN ID;
   choosing a PLMN using the PLMN ID; and
   connecting the PLMN corresponding to the PLMN ID.

9. The method of claim 8, wherein the PLMN ID comprises a core network (CN) operator ID.

10. The method of claim 8, wherein the acquiring of the PLMN ID further comprises:
    determining whether the IDT message is the first message generated after a RRC connection is established; and
    acquiring the selected PLMN ID from the IDT message, if the IDT message is first message generated after the RRC connection is established.

11. The method of claim 8, wherein the acquiring of the PLMN ID comprises:
    determining whether the IDT message is the first message generated after a RRC connection is established; and
    acquiring the selected PLMN ID from a pre-stored PLMN ID, if the IDT message is not the first message generated after the RRC connection is established.

12. An apparatus for performing an initial direct transfer (IDT) in a communication system, the apparatus comprising:
    a controller configured to:
      initiate an IDT procedure when an upper layer requests to establish a signaling connection to a network,
      determine if a multiple Public Land Mobile Network (PLMN) list was broadcasted in a cell where a current RRC connection of a user equipment (UE) was established, and
      if the multiple PLMN list was broadcasted in the cell where the current RRC connection was established, set a PLMN identifier (ID) in an IDT message to a chosen PLMN among PLMNs in the multiple PLMN list; and
    a transmitter configured to transmit the IDT message including PLMN ID.

13. The apparatus of claim 12, wherein the PLMN ID comprises a core network (CN) operator ID.

14. The apparatus of claim 12, wherein the controller is further configured to store the PLMN ID in a memory.

15. The apparatus of claim 12, wherein the controller is further configured to:
    determine whether the IDT message is the first message generated after the RRC connection is established,
    insert the PLMN ID into the IDT message if the IDT message is the first message generated after the RRC connection is established, and
    transmit the IDT message to the transmitter and receiver.

16. The apparatus of claim 12, wherein the controller is further configured to transmit the IDT message without a PLMN ID, if the IDT message is not the first message generated after the RRC connection is established.

17. The apparatus of claim 12, wherein the chosen PLMN is determined by a Non Access Stratum (NAS) or Access Stratum (AS).

18. An apparatus for performing an initial direct transfer (IDT) in a communication system, the apparatus comprising:
    a receiver configured to receive an IDT message for establishing a signaling connection from a user equipment (UE);
    a controller configured to:
      acquire a Public Land Mobile Network identifier (PLMN ID) from the IDT message, the PLMN is an ID of a PLMN ID chosen among PLMNs in a multiple PLMN list broadcast from a cell where a radio resource control (RRC) connection was established, the RRC connection being a current RRC connection of the UE that initiates an IDT procedure, choose a PLMN using the PLMN ID, and
   control a connection between the UE and the PLMN corresponding to the PLMN ID;
  a memory configured to store the PLMN ID; and
  a transmitter configured to communicate with the UE and the PLMN.

19. The apparatus of claim 18, wherein the PLMN ID comprises a core network (CN) operator ID.

20. The apparatus of claim 18, wherein the controller is further configured to:
  determine whether the IDT message is the first message generated after a RRC connection is established, and
  acquire the selected PLMN ID from the IDT message, if the IDT message is the first message generated after the RRC connection is established.

21. The apparatus of claim 18, wherein the controller is further configured to:
  determine whether the IDT message is the first message generated after a RRC connection is established, and
  acquire the selected PLMN ID from the memory, if the IDT message is not the first message generated after the RRC connection is established.

* * * * *